US008792487B2

(12) United States Patent
Khalid et al.

(10) Patent No.: US 8,792,487 B2
(45) Date of Patent: Jul. 29, 2014

(54) COMMUNICATION PATH SELECTION

(75) Inventors: Mohamed Khalid, Cary, NC (US);
Aamer Saeed Akhter, Cary, NC (US);
Kenneth Alan Durazzo, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 834 days.

(21) Appl. No.: 11/842,460

(22) Filed: Aug. 21, 2007

(65) Prior Publication Data

US 2009/0052466 A1    Feb. 26, 2009

(51) Int. Cl.
*H04L 12/28* (2006.01)

(52) U.S. Cl.
USPC ........................................... 370/389

(58) Field of Classification Search
USPC .................................. 370/467, 389
See application file for complete search history.

(56) References Cited

U.S. PATENT DOCUMENTS

| 2004/0029555 | A1* | 2/2004 | Tsai et al. ........................ 455/403 |
| 2004/0213152 | A1* | 10/2004 | Matuoka et al. ................ 370/230 |
| 2004/0213165 | A1* | 10/2004 | Kola et al. ...................... 370/252 |
| 2005/0091307 | A1* | 4/2005 | Venkatsubra et al. .......... 709/203 |
| 2005/0157726 | A1* | 7/2005 | Vesterinen ................... 370/395.5 |
| 2006/0077989 | A1* | 4/2006 | Lu et al. ......................... 370/401 |
| 2006/0174039 | A1* | 8/2006 | Stewart et al. ................. 709/245 |
| 2006/0193295 | A1* | 8/2006 | White et al. .................... 370/336 |
| 2006/0259845 | A1* | 11/2006 | Baek ............................... 714/748 |
| 2007/0104190 | A1* | 5/2007 | Harmjanz et al. ............. 370/389 |
| 2007/0105549 | A1* | 5/2007 | Suda et al. ................... 455/426.2 |
| 2007/0165603 | A1* | 7/2007 | Yokobori et al. .............. 370/352 |
| 2007/0207727 | A1* | 9/2007 | Song et al. .................... 455/3.06 |
| 2008/0151778 | A1* | 6/2008 | Venkitaraman et al. ....... 370/254 |

FOREIGN PATENT DOCUMENTS

EP    1531646    *    5/2005    ............ H04W 48/18

OTHER PUBLICATIONS

Fitzpatrick, J., et al., "SCTP Based Handover Mechanism for VoIP Over IEEE 802.11b Wireless LAN With Heterogeneous Transmission Rates", *IEEE International Conference on Comminications (ICC '06)*, (2006), 2054-2059.

* cited by examiner

*Primary Examiner* — Brandon Renner
*Assistant Examiner* — Faisal Choudhury
(74) *Attorney, Agent, or Firm* — Schwegman Lundberg & Woessner, P.A.

(57) ABSTRACT

In an example embodiment, a method for selecting a communication path is provided. The method may comprise receiving data encapsulated in a transport protocol. In addition, a classification type and exit path information associated with the classification type may be received. The data is associated with the classification type and then is encapsulated in Stream Control Transmission Protocol (SCTP) based on the exit path information. This exit path information is associated with the classification type that is associated with the data.

14 Claims, 10 Drawing Sheets

COMMUNICATION PATH SELECTION

FIELD

The present disclosure relates generally to computer networks. In one example embodiment, the disclosure relates to selection of communication paths.

BACKGROUND

Stream Control Transmission Protocol (SCTP) is a transport layer protocol used for the transport of data in a network. SCTP can transport multiple data streams by aggregating multiple data streams into a single managed bundle. This single managed bundle shares common characteristics, such as same communication path and start and end points. As a result, connection information that would have been transmitted over multiple data streams can be handled and managed as connection information of a single bundle.

The properties of SCTP make it ideal for use as a transport protocol for wide area network (WAN) optimization. It should be appreciated that WAN optimization devices can create an SCTP tunnel between them that carries compressed and optimized traffic that has been proxied at the edges. For example, an SCTP tunnel can be created between network devices to provide a proxy tunnel for a multitude of Transmission Control Protocol (TCP) sessions. This proxy with the SCTP tunnel is implemented such that multiple TCP sessions can be multiplexed or aggregated into a single (or multiple) managed SCTP association(s).

Another area of WAN optimization is the matching of available communication paths to specific user applications based on transmission and/or path characteristics. For example, voice traffic is best transmitted over a communication path with low latency. Accordingly, a communication path with low latency can be selected for transmission of voice traffic. On the other hand, a File Transfer Protocol (FTP) session is best transmitted over a communication path with large bandwidth. Accordingly, a communication path with large bandwidth can be selected for use with an FTP session. However, with the advent of multiplexing multiple TCP sessions into an SCTP tunnel, the traffic characteristics are hidden or not visible because the TCP sessions are encapsulated in SCTP. Without the visibility into the traffic characteristics, communication paths cannot be matched with specific user applications.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth in order to provide a thorough understanding of an example embodiment of the present disclosure. It will be evident, however, to one skilled in the art that the present disclosure may be practiced without these specific details.

Overview

A method for selecting a communication path is provided. The method may comprise receiving data encapsulated in a transport protocol. In addition, a classification type and exit path information associated with the classification type may be received. The data is associated with the classification type and then is encapsulated in Stream Control Transmission Protocol (SCTP) based on the exit path information. This exit path information is associated with the classification type that is associated with the data.

Example Embodiments

The embodiments described herein provide methods and apparatuses for selecting a communication path. In an example embodiment, a table with classification type and exit path information is provided. The table may be transmitted to or relayed to a transport optimization proxy. As will be explained in more detail below, the transport optimization proxy uses the table as part of SCTP management and selection. For example, in an embodiment, during the TCP multiplexing process, the transport optimization proxy uses the table to map different data received to available SCTP communication paths. In addition, the classification type and the exit path information may be defined based on latency, jitter, and/or packet loss. The example embodiments described here also provide methods and apparatus for the determination of latency and jitter and identification of communication paths with packet loss.

Figure 1:
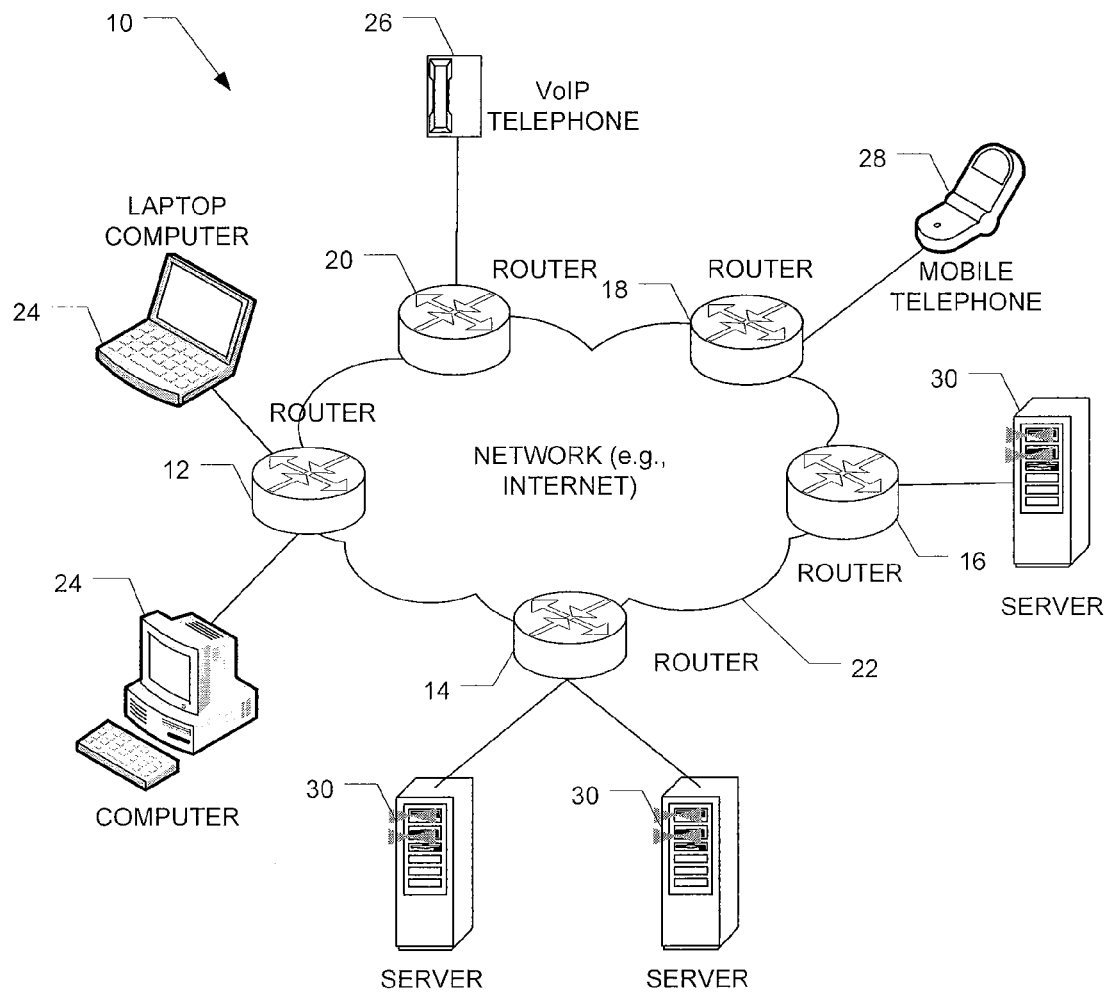
FIG. 1 is a diagram of a networked system, in accordance with an example embodiment.

FIG. 1 is a diagram of a networked system, in accordance with an example embodiment. Example system 10 includes various network endpoints (e.g., network nodes) and network devices, and data is communicated between the various network endpoints and network devices. In the example system 10, network endpoints may include routers 12, 14, 16, 18 and 20. However, it will be appreciated that any number of routers 12-20 may be provided in system 10. Routers 12-20 are shown to be connected via a network which may include one or more Local Area Networks (LANs) and/or Wide Area Networks (WANs), such as the Internet. System 10 also includes network devices including, for example, computers 24, Voice-over-IP (VoIP) telephone 26, mobile telephone 28, and servers 30.

In the example system 10, data is communicated via data packets or datagrams using a variety of suitable communication protocols. For example, packets may be encapsulated and communicated using the Transmission Control Protocol (TCP)/Hypertext Transport Protocol (HTTP), the User Datagram Protocol (UDP) protocol, and/or the SCTP. Further, although system 10 is shown to include routers 12-20, it should be noted that the example embodiments described herein are equally applicable to other network devices, such as switches or the like. Broadly, the example embodiments described herein may be deployed in a variety of network devices that receive digital data for processing and communication to other network devices.

In an example embodiment, data (e.g., data packets) may be received by a network endpoint, such as router 12, 14, 16, 18, 20 or 22, and the data may be processed or analyzed to identify a particular action associated with the data. For example, the data is associated with a classification type after the data is received. After the association, the exit path information associated with the classification type is read. The data is then encapsulated in SCTP based on the exit path information. This process is described in more detail below, in accordance with example embodiments.

Figure 2A:
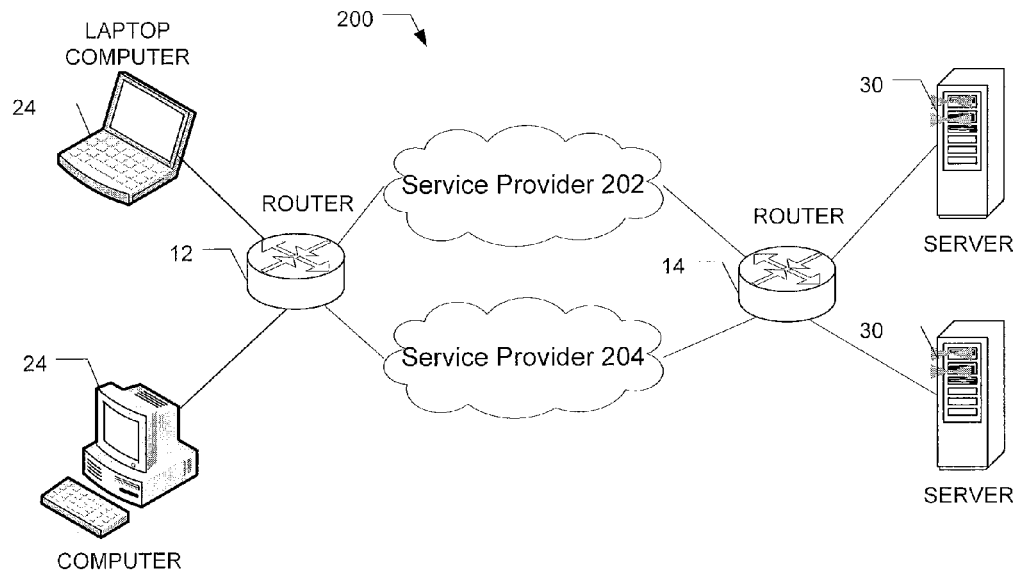
FIGS. 2A and 2B are diagrams illustrating the communication of data through multiple communication paths and the various types of transport protocols used, in accordance with example embodiments.
Figure 2B:
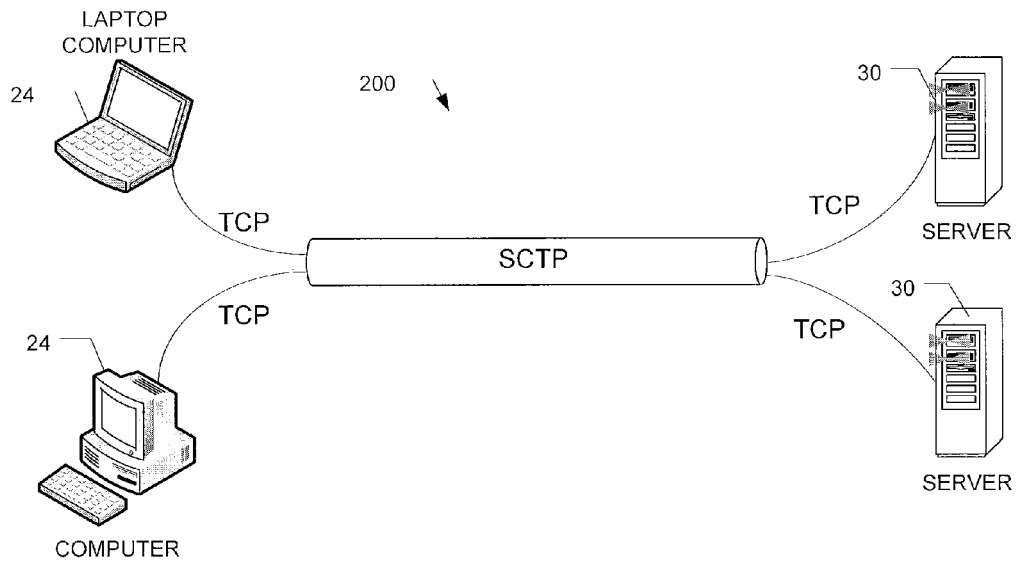

FIGS. 2A and 2B are diagrams illustrating the communication of data through multiple communication paths and the various types of transport protocols used. FIG. 2A is a diagram of a networked system communicating through multiple communication paths, in accordance with an example embodiment. System 200 includes various endpoints and network devices. In the example system 200, network endpoints include routers 12 and 14. System 200 also includes network devices, such as computers 24 and servers 30, in communication with the network endpoints. As shown in FIG. 2A, routers 12 and 14 are linked together by two independent communication paths. A communication path is the route taken by data from one network endpoint to another network endpoint. First communication path is by way of service provider 202 and the second communication path is by way of service provider 204. As a result, router 12 may transmit data either through first communication path provided by service provider 202 or though second communication path provided by service provider 204.

With multiple communication paths, each network endpoint associated with the network layer, such as router 12 or 14, can include multiple network layer addresses. For example, there can be multiple network layer addresses that can be used as a destination address to reach a particular network endpoint. In general, the network layer is a layer that responds to service requests from a transport layer and issues service requests to a data link layer. For example, the network layer can be a layer three of the seven layer Open Systems Interconnection model as well as of the five layer TCP/Internet Protocol (IP) model. Network layer addresses can include, for example, IP addresses, Internetwork Packet Exchange (IPX) addresses, and other network layer addresses.

FIG. 2B is a diagram of the various types of transport protocols used to transport data, in accordance with an example embodiment. Network devices 24 and 30 can encapsulate data in a transport protocol for transport across a network. The data may be encapsulated in a variety of transport protocols. For example, as shown in FIG. 2B, data is initially encapsulated in TCP. Other transport protocols can include UDP, Datagram Congestion Control Protocol (DCCP), and other transport protocols. At the network endpoints, the TCP sessions between devices 24 and 30 are proxied and locally terminated. The network endpoints can further encapsulate the TCP data in SCTP. It should be appreciated that SCTP can transport multiple data streams and the TCP sessions can therefore be tunneled into a single SCTP session. As explained in more detail below, a network endpoint can access exit path information and encapsulate the TCP data in SCTP based on the exit path information.

Figure 3:
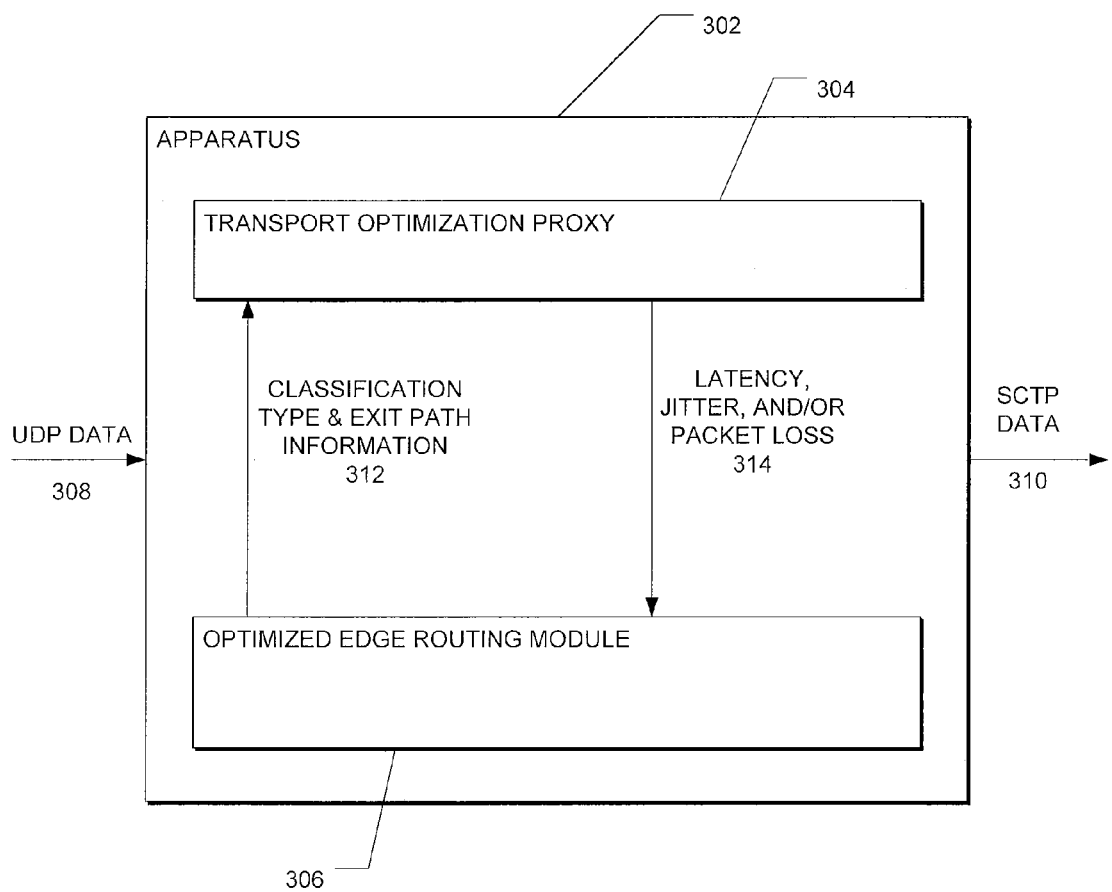
FIG. 3 is a simplified block diagram of modules included in an apparatus, in accordance with an example embodiment.

FIG. 3 is a simplified block diagram of modules included in an apparatus, in accordance with an example embodiment. Apparatus 302 may form a part of one of the network devices depicted in FIG. 1, e.g., routers 12-20. It should be appreciated that apparatus 302 may be deployed in the form of a variety of network devices that receives data for communication to other network devices, such as switches or the like. In various example embodiments, apparatus 302 may be used to implement computer programs, logic, applications, methods, processes, or other software to select communication paths, determine latency and/or jitter, and identify communication paths with packet loss.

As shown in FIG. 3, apparatus 302 includes transport optimization proxy 304 and optimized edge routing (OER) module 306. Transport optimization proxy 304 is communicatively coupled (e.g., via appropriate interfaces) to OER module 306 and to various data sources, so as to allow the modules to share and access information and data. In an example embodiment, transport optimization proxy 304 is configured to receive data 308 encapsulated in a transport protocol. For example, as shown in FIG. 3, data 308 is encapsulated in UDP. Transport optimization proxy 304 is also configured to receive one or more classification types and exit path information associated with the classification types. A classification type is an attribute, a characteristic, a quality, and/or a trait associated with data. For example, a classification type can be associated with a particular process executed on a computing device. An example of a process can be an email application that transmits and receives email data. The email application may use a particular port number. Thus, in an example, the classification type can be a port number associated with the data. The port number can be used to identify the association of data to the email application. Alternatively, the classification type can also be the network layer address associated with the data (e.g., IP address) that may be used, for example, to identify data that is being transmitted to a particular website. In another example, the classification type can include the type of transport protocol used to encapsulate the data. Such classification types can include TCP, UDP, and other transport protocols.

In addition to classification type, transport optimization proxy 304 is also configured to receive exit path information associated with the classification types. Exit path information is configured to identify a communication path. For example, exit path information can include network layer addresses. A network layer address can include the destination network layer address and/or source network layer address that are associated with a communication path. In another example, the exit path information can be an identifier that identifies a network layer address. An example of such an identifier can include a pointer or an index value that refers to a network layer address, which may be stored outside of transport optimization proxy 304. As explained in more detail below, transport optimization proxy 304 then associates data 308 with the classification type received and encapsulates the data in SCTP based on the exit path information associated with the classification type. Apparatus 302 then transmits data 310 encapsulated in SCTP to other network endpoints.

In an example embodiment, transport optimization proxy 304 receives classification type and exit path information 312 from OER module 306. In general, OER module 306 automates routing of data to select communication paths based on factors such as load distribution policy and overall network performance. For example, OER module 306 can make adaptive and dynamic routing adjustments based on criteria such as latency, packet loss, jitter, mean opinion score (MOS), path availability, and traffic load distribution. Such routing adjustments may be in the form of classification type and exit path information 312 that are transmitted to transport optimization proxy 304. Further, as explained in more detail below, transport optimization proxy 304 may also be configured to determine latency and/or jitter and to identify a communication path with packet loss. Transport optimization proxy 304 may transmit latency, jitter, and/or packet loss information 314 to OER module 306, which in turn, may use the information to determine classification type and exit path information 312. It should be appreciated that in other example embodiments, apparatus 302 may include fewer or more modules apart from those shown in FIG. 3. For example, transport optimization proxy 304 may be integrated together with OER module 306 to form one module.

Communication Path Selection

Figure 4:
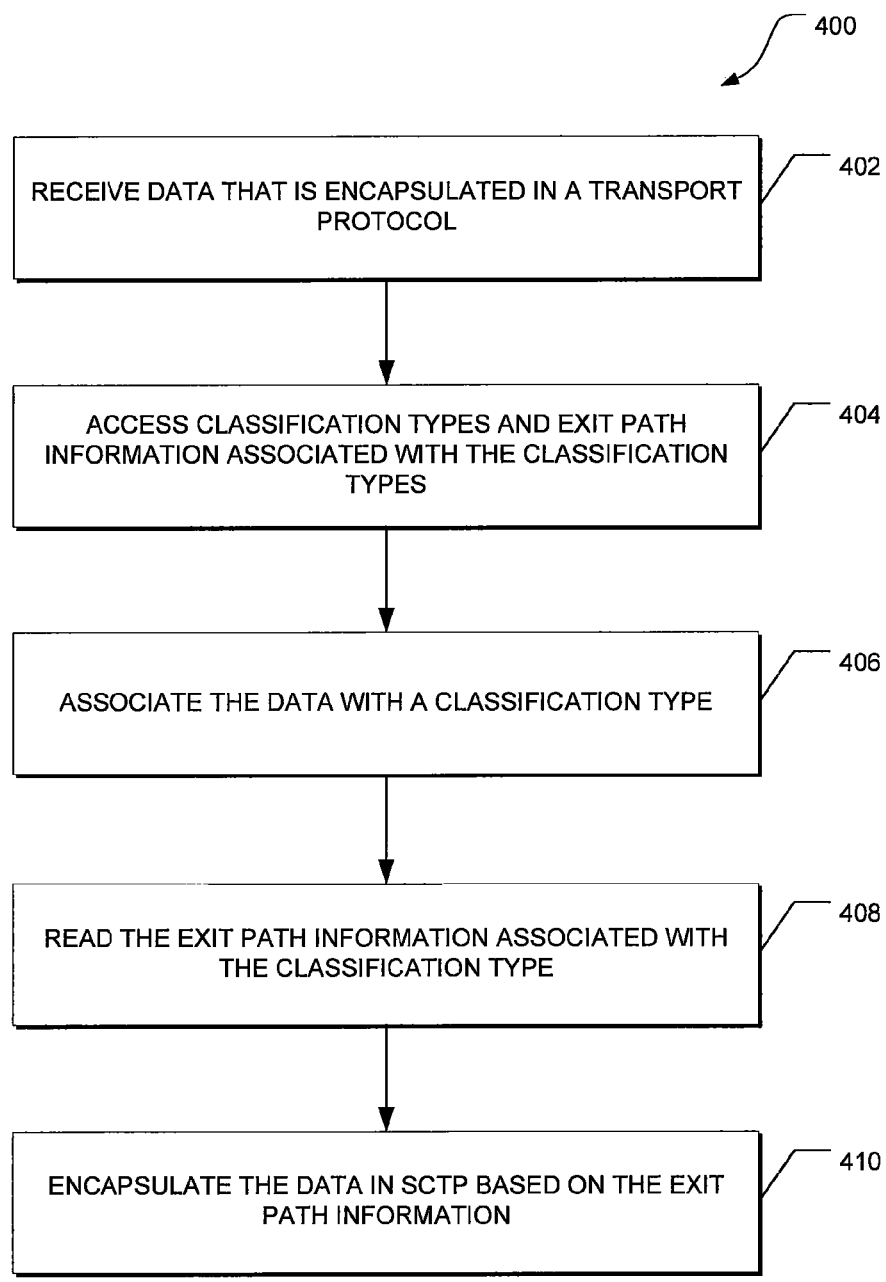
FIG. 4 is a flow diagram of a general overview of a method for selecting a communication path, in accordance with an example embodiment.

FIG. 4 is a flow diagram of a general overview of a method for selecting a communication path, in accordance with an example embodiment. In one example embodiment, method 400 may be implemented by transport optimization proxy 304 of FIG. 3, employed in an apparatus, such as routers 12-20 of FIG. 1. As shown in FIG. 4, starting at 402, the transport optimization proxy receives data that is encapsulated in a transport protocol. In an example, the data may be encapsulated in TCP. Other examples of transport protocol include UDP, VoIP, and other transport protocols. At 404, classification types and exit path information associated with the classification types are accessed. The classification types and exit path information may be accessed from a memory or a storage device within an apparatus. In an example embodiment, the transport optimization proxy receives one or more classification types and exit path information from the OER module. Each classification type is associated with at least one exit path information. The classification types and exit path information may be stored in a variety of data structures. The following Table A is an example of a data structure in the form of a table that stores classification types and exit path information.

TABLE A

| Port Number (Classification Types) | IP Address (Exit path information) |
|---|---|
| 62 | 192.168.0.264 |
| 65 | 192.168.0.2 |
| 80 | 192.168.0.1 |
| 81 | 192.165.0.254 |

The above Table A is organized in rows and columns. The column "Port Number" includes various classification types. Each classification type is associated with an exit path information. The column "IP Address" includes the exit path information associated with each of the classification types. In the example embodiment shown in Table A, each row illustrates a set or pair of classification type and associated exit path information. For example, the IP address "192.168.0.264" is associated with port number "62." Similarly, the IP address "192.168.0.1" is associated with port number "80." Other examples of data structures include arrays, lists, and other data structures.

At 406, the data received is associated with a classification type. As explained in more detail below, the association may include identifying the classification type of the data and then locating the classification type stored in the data structure that matches the classification type of the data. Thereafter, in an example embodiment, the exit path information that is associated with the located classification type is read from the data structure at 408. Here, the exit path information is associated with the classification type that is associated with the data. As explained in more detail below, at 410, the data then is encapsulated in SCTP based on the exit path information.

Figure 5:
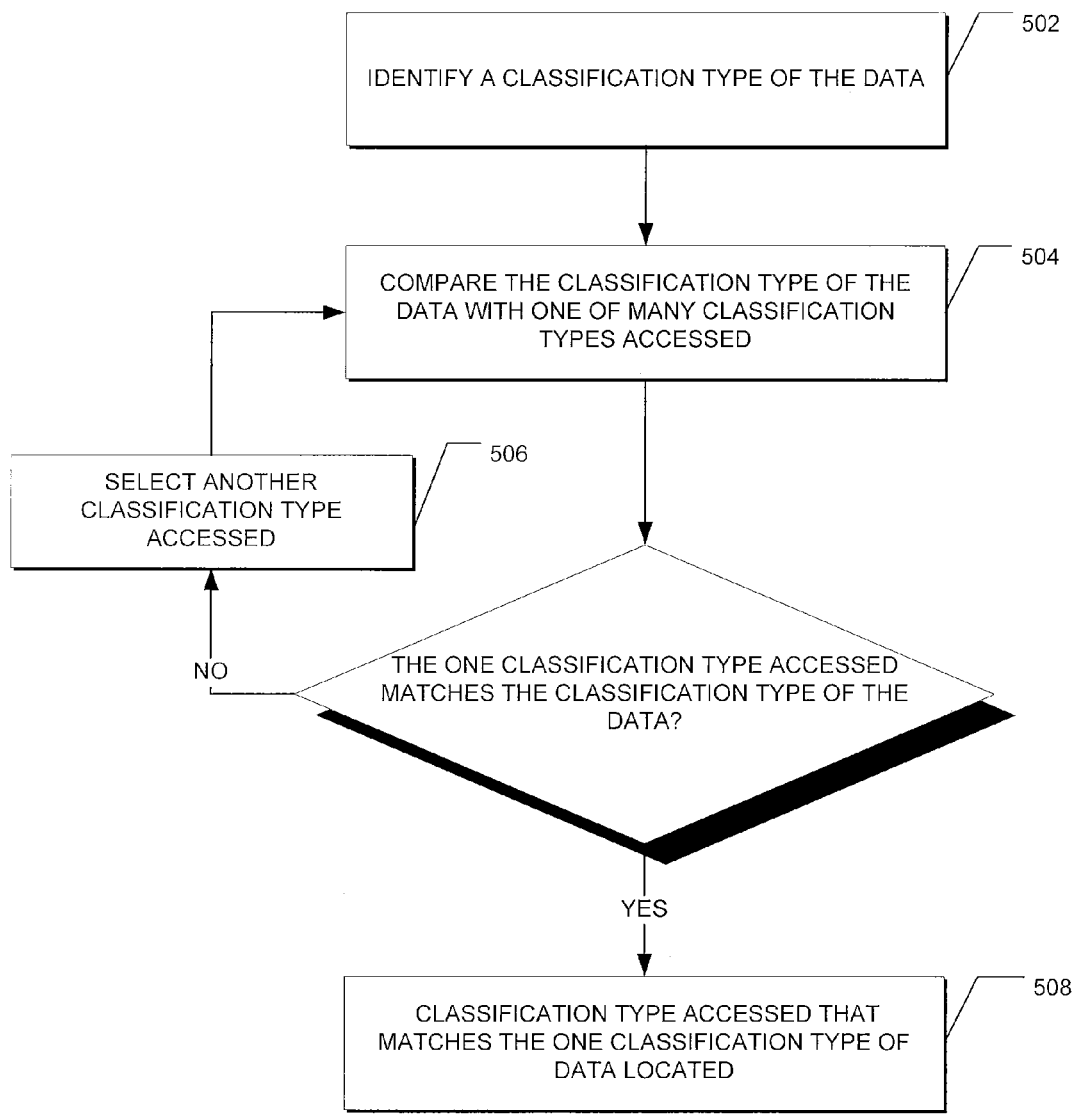
FIG. 5 is a flow diagram of detailed operations for associating the data with a classification type, in accordance with an example embodiment.

FIG. 5 is a flow diagram of detailed operations for associating the data with a classification type, in accordance with an example embodiment. To associate data received with a classification type, the classification type of the data is identified at 502. Depending on the classification type, a variety of methods may be used to identify the classification. In an example embodiment, the transport optimization proxy may read the port number from a header attached to a unit of data. In another example embodiment, the transport optimization proxy may identify the transport protocol of the data from the header attached to the unit of data. In an alternative embodiment, the transport optimization proxy may read the IP address from an IP packet header. In still another example embodiment, transport optimization proxy may identify that the data is associated with a video data stream by analyzing a portion of the data for a pattern that is associated with a video data stream. Alternatively, the transport optimization proxy may identify that the data is associated with a video data stream by reading a particular code stored in a header attached to the unit of data.

At 504, after the classification type of the data is identified, the classification type of the data is compared with one of many classification types previously accessed. The transport optimization proxy may receive one or more classification types and exit path information associated with the classification types. For example, in an example embodiment, the transport optimization proxy may receive and access a data structure with multiple classification types and exit path information. The classification type of the data is compared with each of the classification type stored in the data structure. The comparison may include, for example, selecting one classification type from the data structure and comparing it with the classification type of the data. If this one classification type from the data structure matches the classification type of the data, then this one classification type is located in the data structure, as shown at 508. As described above, the exit path information associated with this one classification type then is read and used for the SCTP encapsulation of the data. On the other hand, if this one classification type from the data structure does not match the classification type of the data, then the transport optimization proxy may access another classification type from the data structure at 506 and compare it with the classification type of the data. This method of comparison may be repeated for each classification type stored in the data structure.

In addition to the association technique described in FIG. 5, it should be appreciated that a variety of other association techniques may be used to associate data received with a classification type. Examples of other association techniques may include hashing, linked list, and other association techniques.

Figure 6:
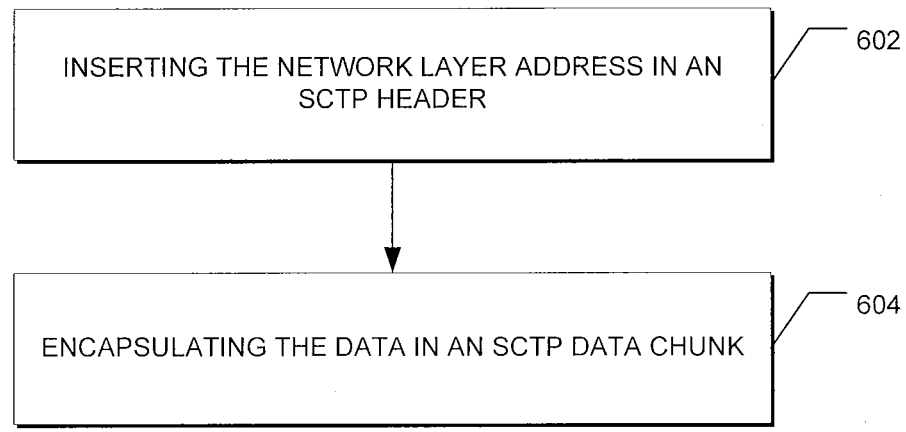
FIG. 6 is a flow diagram of detailed operations for encapsulating the data in SCTP based on the exit path information, in accordance with an example embodiment.

FIG. 6 is a flow diagram of detailed operations for encapsulating data in SCTP based on the exit path information, in accordance with an example embodiment. With the exit path information, the one or more network layer addresses that are associated with a communication path can be determined or extracted. In an example embodiment, the exit path information is a network layer address. In another example embodiment, the exit path information may include a pointer to a network layer address. An SCTP packet comprises an SCTP header and one or more SCTP data chunks. To encapsulate the data in SCTP, the network layer address is inserted into an SCTP header at 602. For example, the source IP address and the destination address, which define a communication path, can be inserted into an SCTP header. At 604, the data is encapsulated in an SCTP data chunk. An SCTP data chunk is a unit of information within an SCTP packet. It should be noted that one or more packets of data may be encapsulated in an SCTP data chunk, and multiple SCTP data chunks may be bundled together to form an SCTP packet.

Figure 7:
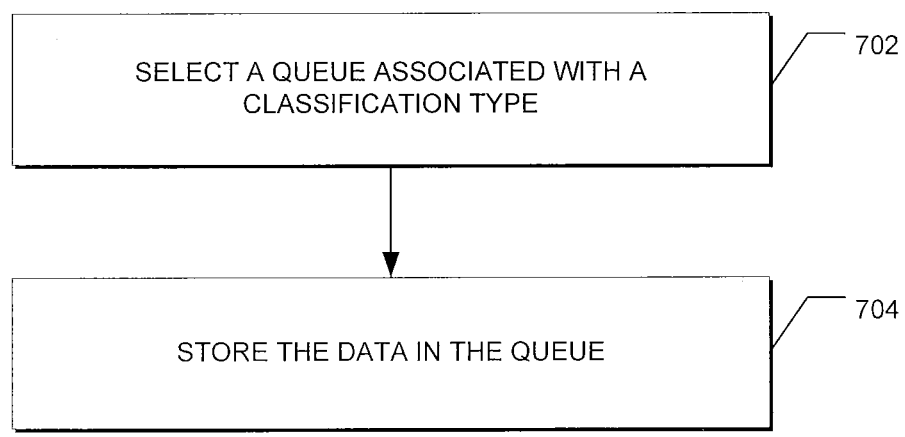
FIG. 7 is a flow diagram of a general overview of a method for storing data in a queue that is associated with a classification type, in accordance with an example embodiment.

FIG. 7 is a flow diagram of a general overview of a method for storing data in a queue that is associated with a classification type, in accordance with an example embodiment. A queue is a data structure configured for storing received data. In an example embodiment, the transport optimization proxy may include multiple queues, where each queue is associated with or assigned to a classification type. For example, if there are three classification types, then the transport optimization proxy can include three queues, where each queue is associated with an individual classification type. In another example, if there are five classification types, then the transport optimization proxy can include five queues. The classification type may be associated with a communication path. For example, the classification type may provide a port number that corresponds to a communication path. As such, in another example embodiment, each queue can also be associated with or assigned to each communication path. In still another example embodiment, each queue can further be associated with or assigned to each exit path information.

With a classification type, the transport optimization proxy can therefore select a queue that is associated with the classification type at 702 from multiple queues. In an example embodiment, after the data is encapsulated in SCTP, the data (e.g., SCTP data chunks) may be stored in the selected queue at 704. As a result, multiple SCTP data chunks may be stored in and accumulated in a queue, and the transport optimization proxy can retrieve the SCTP data chunks from the queue and bundle them together into a single SCTP packet.

In one example, two classification types are provided, designated Classification Type X and Classification Type Y. Two queues, designated Queue X and Queue Y, are associated with Classification Type X and Classification Type Y, respectively. The transport optimization proxy receives a first SCTP data chunk that is associated with a Classification Type X. Since Queue X is associated with Classification Type X, the transport optimization proxy selects Queue X and stores the first SCTP data chunk in Queue X. The transport optimization proxy then receives a second SCTP data chunk that also is associated with Classification Type X. The second SCTP data chunk therefore also is stored in Queue X. The transport optimization proxy finally receives a third SCTP data chunk that is associated with a Classification Type Y. Since Queue Y is associated with Classification Type Y, the transport optimization proxy selects Queue Y and stores the third SCTP data chunk in Queue Y. When the data is ready to be transmitted, the transport optimization proxy retrieves the first and second SCTP data chunks from Queue X and bundles them together into a single SCTP packet for transmission along a communication path. The transport optimization proxy may also retrieve the third SCTP data chunk from Queue Y and encapsulates the third SCTP data chunk into a single SCTP packet for transmission along another communication path.

Latency and Jitter Determination

Figure 8:
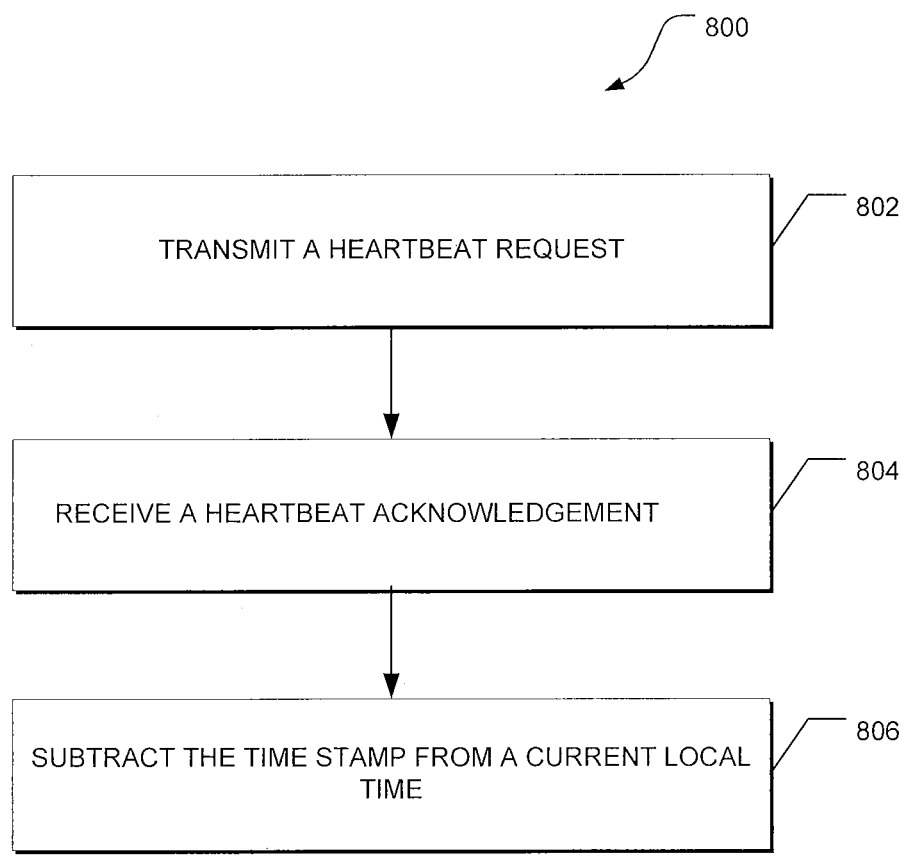
FIG. 8 is a flow diagram of a general overview of a method for determining latency, in accordance with an example embodiment.

FIG. 8 is a flow diagram of a general overview of a method for determining latency, in accordance with an example embodiment. In an example embodiment, method 800 may be implemented by transport optimization proxy 304 of FIG. 3, employed in an apparatus, such as routers 12-20 of FIG. 1. As shown in FIG. 8, starting at 802, the transport optimization proxy transmits an SCTP heartbeat request. It should be appreciated that the SCTP protocol defines an SCTP heartbeat request as a message that may be sent to a peer endpoint to probe the reachability of a particular network layer address. Along with various parameters, the SCTP heartbeat request includes a time stamp that defines the time when the SCTP heartbeat request was transmitted.

In response to receiving the SCTP heartbeat request, a network endpoint transmits an SCTP heartbeat acknowledgement to the transport optimization proxy. An SCTP heartbeat acknowledgment is a message transmitted in response to the receipt of an SCTP heartbeat request. The SCTP heartbeat acknowledgement is sent to the same network address of an IP datagram containing the SCTP heartbeat request to which the SCTP heartbeat acknowledgement is responding. Still referring to FIG. 8, the transport optimization proxy receives the SCTP heartbeat acknowledgement at 804. Here, the heartbeat acknowledgment also includes the same time stamp that was included in the corresponding SCTP heartbeat request. In general, latency is the transit time of data over one or more communication paths. The latency, for example, can also be stated as the time delta between the transmission and receipt of data between two hosts. The latency can be expressed as Latency=Time Stamp−Current Time where the time stamp defines the time when the SCTP heartbeat request was transmitted or the time upon transmission from source host. The current time is the time when the SCTP heartbeat acknowledgement was received or the time of receipt of data on destination host. At 806, the time stamp is subtracted from the current time to define a difference, where the difference is the latency.

In general, jitter is the variation in the delay of data. It should be appreciated that jitter may be determined from multiple latencies that are measured at particular intervals. The variation between the multiple latencies defines the jitter. As discussed above, the classification type and the exit path information can be defined based on latency and/or jitter. For example, the transport optimization proxy can determine the latency and/or jitter and transmit them to an OER module. The OER module may use the latency and/or jitter to define the classification type and exit path information that is associated with the classification type. Thereafter, in an example embodiment, the OER module can transmit the classification type and the exit path information back to the transport optimization proxy.

Identification of Communication Path with Packet Loss

Figure 9:
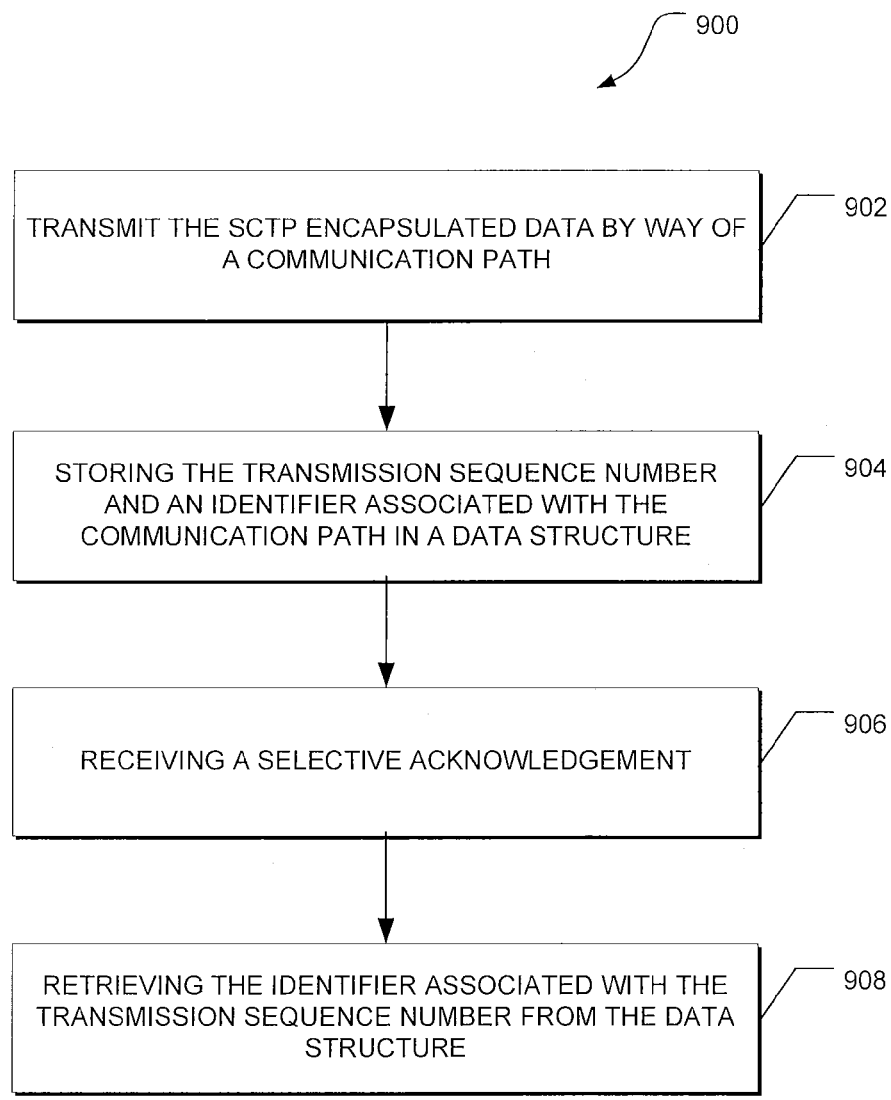
FIG. 9 is a flow diagram of a general overview of a method for identifying a communication path with packet loss, in accordance with an example embodiment.

FIG. 9 is a flow diagram of a general overview of a method for identifying a communication path with packet loss, in accordance with an example embodiment. In one example embodiment, method 900 may be implemented by transport optimization proxy 304 of FIG. 3, employed in an apparatus, such as routers 12-20 of FIG. 1. As shown in FIG. 9, at 902, the transport optimization proxy transmits data encapsulated in SCTP to another network endpoint by way of a communication path. The data is associated with a transmission sequence number. Transmission sequence numbers are a series of numbers assigned to fragments of data. For example, the SCTP protocol may attach a transmission sequence number to each SCTP data chunk. At 904, the transmission sequence number and an identifier associated with the communication path are stored in a data structure. The identifier may be a number, an alphanumeric string, or other identifiers that identifies a particular communication path. In one example, the SCTP protocol assigns and attaches a transmission sequence number of "1" to an SCTP data chunk. The SCTP data chunk is to be transmitted over a communication path identified as "Path A." Both the transmission sequence number "1" and the identifier "Path A" may be stored in a data structure, such as a table.

Upon the receipt of the data at a network endpoint, the network endpoint may transmit a selective acknowledgement to acknowledge the transmission sequence numbers received. Thus, at 906, the transport optimization proxy receives a selective acknowledgement from the network endpoint acknowledging the transmission sequence numbers received. The continuity of the transmission sequence numbers received can be examined to detect a gap in the sequence. For example, transmission sequence numbers 1-10 were transmitted, but the selective acknowledgement acknowledges only the receipt of transmission sequence numbers 1-5 and 7-10. Therefore, a gap in the sequence of transmission sequence numbers, which is identified as transmission sequence number 6, is identified.

With the receipt of the selective acknowledgement, the transmission sequence number associated with the gap is identified. At 908, the transport optimization proxy therefore locates the transmission sequence number associated with the gap from the data structure and retrieves the identifier associated with the transmission sequence number. Since the identifier identifies a particular communication path, the communication path with the packet loss is identified. As discussed above, the classification type and the exit path information can be defined based on packet loss. For example, the transport optimization proxy can identify the communication path with packet loss and transmit the identification to an OER module. The OER module may use the identification to define the classification type and exit path information. Thereafter, in an example embodiment, the OER module can transmit the classification type and the exit path information back to the transport optimization proxy.

Figure 10:
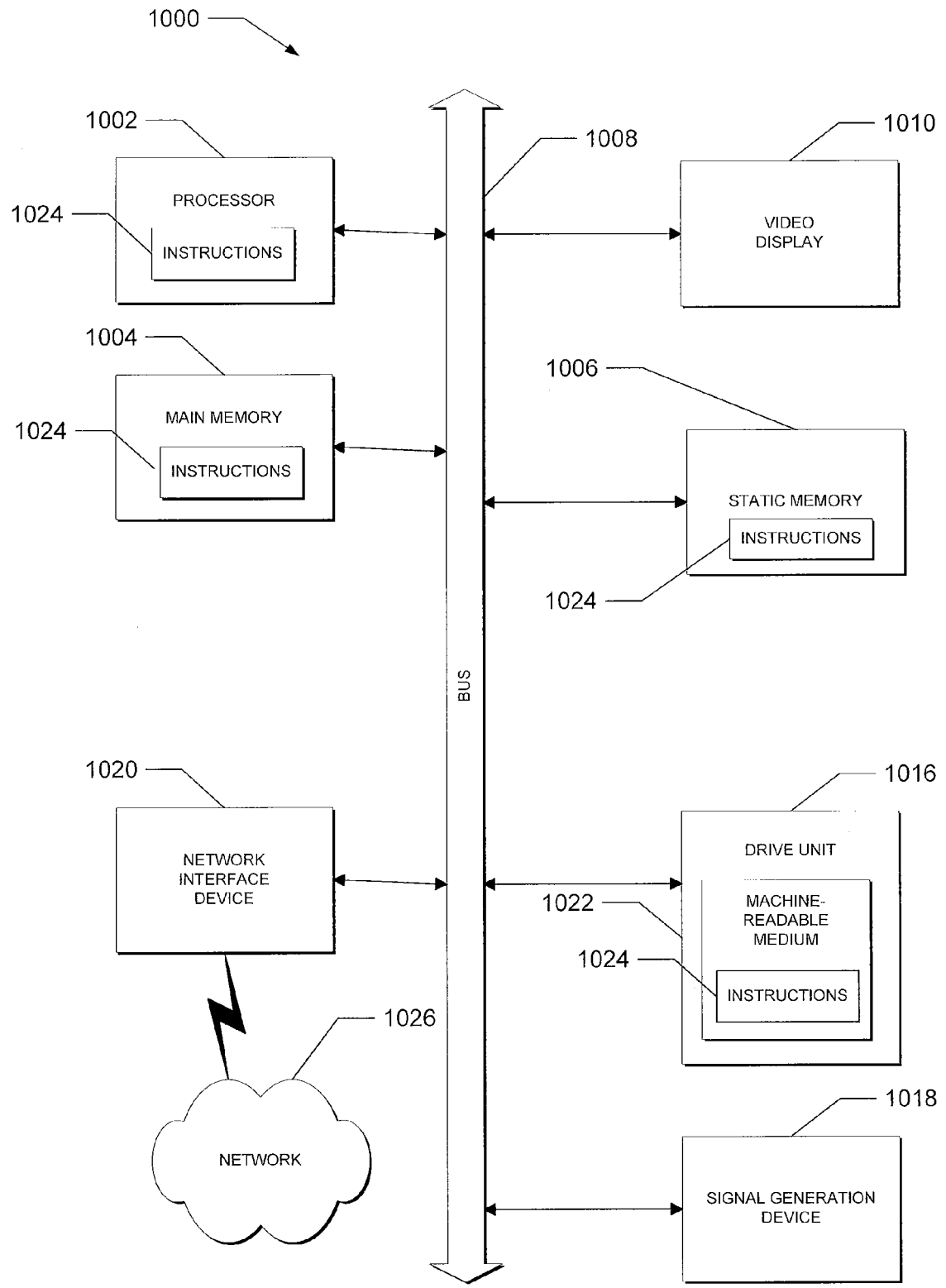
FIG. 10 is a simplified block diagram of a machine in the example form of computing system within which a set of instructions, for causing the machine to perform any one or more of the methodologies discussed herein, may be executed, in accordance with an example embodiment.

FIG. 10 is a simplified block diagram of a machine in the example form of computing system within which a set of instructions, for causing the machine to perform any one or more of the methodologies discussed herein, may be executed. In alternative embodiments, the machine may be connected (e.g., networked) to other machines. The machine may be a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing system 1000 includes processor 1002 (e.g., a central processing unit (CPU)), main memory 1004 and static memory 1006, which communicate with each other via bus 1008. Computing system 1000 may further include video display unit 1010 (e.g., a liquid crystal display (LCD)). Computing system 1000 may also include, disk drive unit 1016 and network interface device 1020.

Disk drive unit 1016 includes machine-readable medium 1022 on which is stored one or more sets of instructions and data structures (e.g., software 1024) embodying or utilized by any one or more of the methodologies or functions described herein. Software 1024 may also reside, completely or at least partially, within main memory 1004 and/or within processor 1002 during execution thereof by computing system 1000, main memory 1004 and processor 1002 also constituting machine-readable, tangible media.

Software 1024 may further be transmitted or received over network 1026 via network interface device 1020 utilizing any one of a number of well-known transfer protocols (e.g., HTTP).

While machine-readable medium 1022 is shown in an example embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
receiving data that is encapsulated in a particular transport protocol;
accessing a data structure listing a plurality of classification types and exit path information associated with each of the classification types, wherein each of the plurality of classification types is associated with a particular application configured to generate data, wherein the plurality of classification types and the exit path information are defined based on a packet loss;
identifying a classification type of the received data based on an application utilized to generate the received data;
comparing the classification type of the received data with the classification types included in the accessed data structure to identify a match between the classification type of the received data and one of the classification types included in the accessed data structure;

encapsulating the received data in a Stream Control Transmission Protocol (SCTP) packet and writing the exit path information associated with the matched classification type into a header of the SCTP packet; and identifying a communication path associated with the packet loss, the identification of the communication path associated with the packet loss comprising:

transmitting the data encapsulated in the SCTP packet by way of the communication path, the data being associated with a transmission sequence number;

storing the transmission sequence number and an identifier associated with the communication path in a data structure;

receiving a selective acknowledgement, the selective acknowledgement being configured to identify a gap in a sequence of a plurality of transmission sequence numbers, the transmission sequence number being associated with the gap; and retrieving the identifier associated with the transmission sequence number from the data structure.

2. The method of claim 1, further comprising:
selecting a queue associated with the matched classification type from a plurality of queues; and
storing the data in the queue.

3. The method of claim 1, further comprising reading the exit path information associated with the matched classification type.

4. The method of claim 1, wherein the exit path information is a network layer address, and wherein the encapsulating the data comprises:

inserting the network layer address in the header of the SCTP packet; and encapsulating the data in an SCTP data chunk, the SCTP data chunk being associated with the SCTP packet.

5. The method of claim 1, wherein the plurality of classification types and the exit path information are defined based at least in part on a latency.

6. The method of claim 5, further comprising determining the latency, the determination of the latency comprising:

transmitting an SCTP heartbeat request, the SCTP heartbeat request including a time stamp;

receiving an SCTP heartbeat acknowledgement, the SCTP heartbeat acknowledgement including the time stamp; and subtracting the time stamp from a current time to define a difference, the difference being the latency.

7. An apparatus comprising:
a processor; and
a memory in communication with the processor, the memory comprising instructions that, when executed by the processor, cause the processor to perform operations comprising:

receiving data that is encapsulated in a particular transport protocol;

accessing a data structure listing a plurality of classification types and exit path information associated with each of the classification types, wherein each of the plurality of classification types is associated with a particular application configured to generate data, wherein the plurality of classification types and the exit path information are defined based on a packet loss;

identifying a classification type of the received data based on an application utilized to generate the received data;

comparing the classification type of the received data with the classification types included in the accessed data structure to identify a match between the classification type of the received data and one of the classification types included in the accessed data structure;

encapsulating the received data in a Stream Control Transmission Protocol (SCTP) packet and write the exit path information associated with the matched classification type into a header of the SCTP packet; and identifying a communication path associated with the packet loss, the identification of the communication path associated with the packet loss comprising:

transmitting the data encapsulated in the SCTP packet by way of a communication path, the data being associated with a transmission sequence number;

storing the transmission sequence number and an identifier associated with the communication path in a data structure;

receiving a selective acknowledgement, the selective acknowledgement being configured to identify a gap in a sequence of a plurality of transmission sequence numbers, the transmission sequence number being associated with the gap; and retrieving the identifier associated with the transmission sequence number from the data structure.

8. The apparatus of claim 7, wherein the operations further comprise:

selecting a queue associated with the matched classification type from a plurality of queues; and storing the data in the queue after the data is encapsulated in the SCTP packet.

9. The apparatus of claim 7, wherein the operations further comprise:

inserting an IP address in the header of the SCTP packet; and encapsulating the data in an SCTP data chunk, the SCTP data chunk being associated with the SCTP packet.

10. The apparatus of claim 7, wherein the operations further comprise:

transmitting an SCTP heartbeat request, the SCTP heartbeat request including a time stamp;

receiving an SCTP heartbeat acknowledgement, the SCTP heartbeat acknowledgement including the time stamp; and subtracting the time stamp from a current time to define a difference, the difference being a latency.

11. A non-transitory machine-readable storage medium comprising instructions that, when executed by one or more processors of a machine, cause the machine to perform operations comprising:

receiving data that is encapsulated in a particular transport protocol;

accessing a data structure listing a plurality of classification types and exit path information associated with each of the classification types, wherein each of the plurality of classification types is associated with a particular application configured to generate data, wherein the plurality of classification types and the exit path information are defined based on a packet loss;

identifying a classification type of the received data based on an application utilized to generate the received data;

comparing the classification type of the received data with the plurality of classification types included in the accessed data structure to identify a match between the classification type of the received data and at least one of the plurality of classification types included in the accessed data structure;

encapsulating the received data in a Stream Control Transmission Protocol (SCTP) packet and writing the exit path information that is associated with the matched classification type into a header of the SCTP packet; and identifying a communication path associated with the packet loss, the identification of the communication path associated with the packet loss comprising:

transmitting the data encapsulated in the SCTP packet by way of a communication path, the data being associated with a transmission sequence number;

storing the transmission sequence number and an identifier associated with the communication path in a data structure;

receiving a selective acknowledgement, the selective acknowledgement being configured to identify a gap in a sequence of a plurality of transmission sequence numbers, the transmission sequence number being associated with the gap; and retrieving the identifier associated with the transmission sequence number from the data structure.

12. The storage medium of claim 11, wherein the exit path information identifies a plurality of communication paths, and wherein the operations further comprise:

selecting one of a plurality of queues associated with one of a plurality of communication paths; and storing the data in the one of the plurality of queues after the data is encapsulated in the SCTP packet.

13. An apparatus comprising a transport optimization module implemented by one or more processors, the transport optimization module being configured to:

receive data that is encapsulated in a particular transport protocol;

access a data structure listing a plurality of classification types and exit path information associated with each of the classification types, wherein each of the plurality of classification types is associated with a particular application configured to generate data, wherein the plurality of classification types and the exit path information are defined based on a packet loss;

identify a classification type of the received data based on an application utilized to generate the received data;

compare the classification type of the received data with the classification types included in the accessed data structure to identify a match between the classification type of the received data and one of the classification types included in the accessed data structure;

encapsulate the received data in a Stream Control Transmission Protocol (SCTP) packet and write the exit path information associated with the matched classification type into a header of the SCTP packet; and identify a communication path associated with the packet loss, the identification of the communication path associated with the packet loss comprising:

transmitting the data encapsulated in the SCTP packet by way of a communication path, the data being associated with a transmission sequence number;

storing the transmission sequence number and an identifier associated with the communication path in a data structure;

receiving a selective acknowledgement, the selective acknowledgement being configured to identify a gap in a sequence of a plurality of transmission sequence numbers, the transmission sequence number being associated with the gap; and retrieving the identifier associated with the transmission sequence number from the data structure.

14. The method of claim 1, wherein the received data corresponds to at least one of email data generated by an email application and video stream data generated by a video application.

* * * * *